(12) United States Patent
Iizuka et al.

(10) Patent No.: US 10,941,788 B2
(45) Date of Patent: Mar. 9, 2021

(54) ELECTRIC COMPRESSOR

(71) Applicant: IHI Corporation, Koto-ku (JP)

(72) Inventors: Kuniaki Iizuka, Koto-ku (JP); Takashi Yoshida, Koto-ku (JP); Yuji Sasaki, Koto-ku (JP); Tatsumi Inomata, Koto-ku (JP); Takuya Ozasa, Koto-ku (JP); Ryosuke Yumoto, Koto-ku (JP); Takashi Mori, Koto-ku (JP)

(73) Assignee: IHI Corporation, Koto-ku (JP)

( * ) Notice: Subject to any disclaimer, the term of this patent is extended or adjusted under 35 U.S.C. 154(b) by 20 days.

(21) Appl. No.: 16/461,513

(22) PCT Filed: Jan. 24, 2018

(86) PCT No.: PCT/JP2018/002162
§ 371 (c)(1),
(2) Date: May 16, 2019

(87) PCT Pub. No.: WO2018/139497
PCT Pub. Date: Aug. 2, 2018

(65) Prior Publication Data
US 2019/0345956 A1  Nov. 14, 2019

(30) Foreign Application Priority Data
Jan. 25, 2017  (JP) .............................. JP2017-011364

(51) Int. Cl.
*F04D 29/58* (2006.01)
*F04D 25/06* (2006.01)
*F04D 29/04* (2006.01)

(52) U.S. Cl.
CPC ........... *F04D 29/584* (2013.01); *F04D 25/06* (2013.01); *F04D 29/5806* (2013.01); *F04D 29/5813* (2013.01); *F04D 29/04* (2013.01)

(58) Field of Classification Search
CPC ............. F04D 29/5806; F04D 29/5813; F04D 29/046–049; F04D 29/056–059;
(Continued)

(56) References Cited

U.S. PATENT DOCUMENTS

| 2,831,662 A | * | 4/1958 | Hirsch | ..................... | H02K 5/20 |
| | | | | | 165/156 |
| 3,567,975 A | * | 3/1971 | Biesack | ................... | H02K 9/19 |
| | | | | | 310/54 |

(Continued)

FOREIGN PATENT DOCUMENTS

| CN | 101458003 A | 6/2009 |
| CN | 103997163 A | 8/2014 |

(Continued)

OTHER PUBLICATIONS

International Search Report dated Apr. 17, 2018 in PCT/JP2018/002162 filed on Jan. 24, 2018.

*Primary Examiner* — Devon C Kramer
*Assistant Examiner* — Thomas Fink
(74) *Attorney, Agent, or Firm* — Oblon, McClelland, Maier & Neustadt, L.L.P.

(57) ABSTRACT

An electric compressor includes a rotation shaft, a compressor impeller, a rotor portion, a stator portion, and a motor housing. The motor housing includes an inner housing which includes a first cylindrical portion surrounding and holding the stator portion and an outer housing which includes a second cylindrical portion surrounding and holding the first cylindrical portion of the inner housing. An outer peripheral surface of the stator portion is in contact with an inner peripheral surface of the first cylindrical portion of the inner housing. An outer peripheral surface of the first cylindrical portion is provided with a first groove portion disposed to turn around an axis of the rotation shaft by one (Continued)

turn or more and the first groove portion includes a spiral groove portion.

5 Claims, 3 Drawing Sheets

(58) Field of Classification Search
CPC .. H02K 9/06; H02K 9/08; H02K 9/16; H02K 9/19; H02K 9/197; H02K 2005/1287; H02K 5/20
See application file for complete search history.

(56) References Cited

U.S. PATENT DOCUMENTS

| | | | | |
|---|---|---|---|---|
| 4,959,570 | A * | 9/1990 | Nakamura | H02K 9/20 310/54 |
| 5,220,233 | A * | 6/1993 | Birch | H02K 1/2733 310/156.28 |
| 5,491,370 | A * | 2/1996 | Schneider | H02K 7/006 310/54 |
| 5,857,348 | A | 1/1999 | Conry | |
| 6,087,744 | A * | 7/2000 | Glauning | H02K 1/32 310/58 |
| 6,329,731 | B1 * | 12/2001 | Arbanas | F16H 57/0416 310/52 |
| 7,160,086 | B2 * | 1/2007 | Maceyka | H02K 9/06 310/63 |
| 8,183,723 | B2 * | 5/2012 | Fee | H02K 5/20 310/54 |
| 8,875,825 | B2 * | 11/2014 | Asakura | B60K 6/405 180/68.4 |
| 8,896,166 | B2 * | 11/2014 | Hofkirchner | H02K 9/19 310/54 |
| 9,472,995 | B2 * | 10/2016 | Liu | H02K 5/20 |
| 9,732,766 | B2 * | 8/2017 | Thompson | F04D 17/125 |
| 10,411,562 | B2 * | 9/2019 | Anghel | H02K 9/19 |
| 10,622,854 | B2 * | 4/2020 | Takano | H02K 1/28 |
| 10,644,568 | B2 * | 5/2020 | Yamada | H02K 3/24 |
| 10,715,011 | B2 * | 7/2020 | Gu | H02K 9/18 |
| 10,715,013 | B2 * | 7/2020 | Anghel | H02K 3/47 |
| 2003/0143093 | A1 * | 7/2003 | Mabe | F04D 25/06 417/423.8 |
| 2004/0005228 | A1 * | 1/2004 | Agrawal | F04D 29/053 417/365 |
| 2004/0179947 | A1 * | 9/2004 | Agrawal | F04D 29/624 417/212 |
| 2005/0006963 | A1 * | 1/2005 | Takenaka | H02K 9/19 310/52 |
| 2005/0151431 | A1 | 7/2005 | Cronin et al. | |
| 2005/0253465 | A1 * | 11/2005 | Takenaka | H02K 5/20 310/52 |
| 2006/0024178 | A1 * | 2/2006 | Chen | F01D 3/00 417/407 |
| 2007/0065276 | A1 * | 3/2007 | Muller | F04D 29/083 415/170.1 |
| 2007/0065317 | A1 * | 3/2007 | Stock | F04D 29/584 417/423.11 |
| 2008/0169088 | A1 * | 7/2008 | Aoki | F28F 3/048 165/104.19 |
| 2008/0179972 | A1 * | 7/2008 | Aoki | H01L 21/4878 310/52 |
| 2009/0009013 | A1 | 1/2009 | Baumann et al. | |
| 2009/0044548 | A1 * | 2/2009 | Masoudipour | F04D 29/057 62/115 |
| 2009/0127946 | A1 | 5/2009 | Fee et al. | |
| 2010/0001597 | A1 | 1/2010 | Noll | |
| 2010/0247343 | A1 | 9/2010 | Shimizu et al. | |
| 2011/0135519 | A1 * | 6/2011 | Cho | F04D 29/5813 417/423.7 |
| 2011/0243762 | A1 * | 10/2011 | Daikoku | F16C 37/002 417/321 |
| 2012/0313465 | A1 * | 12/2012 | Prix | H02K 5/20 310/54 |
| 2013/0119793 | A1 * | 5/2013 | Hofkirchner | H02K 11/33 310/54 |
| 2014/0186745 | A1 * | 7/2014 | Metz | H01M 8/04089 429/514 |
| 2014/0232218 | A1 | 8/2014 | Takano et al. | |
| 2015/0226467 | A1 * | 8/2015 | Sommer | H02K 7/09 62/79 |
| 2015/0233384 | A1 | 8/2015 | Thompson et al. | |
| 2015/0275920 | A1 | 10/2015 | Thompson et al. | |
| 2015/0280525 | A1 * | 10/2015 | Rippel | H02K 9/24 310/54 |
| 2015/0308456 | A1 * | 10/2015 | Thompson | H02K 9/00 417/244 |
| 2016/0138841 | A1 * | 5/2016 | Thornton | F25B 31/006 62/505 |
| 2017/0328269 | A1 * | 11/2017 | Yamashita | F01P 7/14 |
| 2019/0195212 | A1 * | 6/2019 | Sasaki | F04B 39/00 |
| 2019/0226486 | A1 * | 7/2019 | Iizuka | F02B 33/40 |
| 2019/0284992 | A1 * | 9/2019 | Hoke | F01D 25/12 |
| 2020/0295628 | A1 * | 9/2020 | Reichert | H02K 5/1735 |

FOREIGN PATENT DOCUMENTS

| | | |
|---|---|---|
| CN | 105041685 A | 11/2015 |
| DE | 10 2015 007 379 A1 | 1/2016 |
| JP | 2-299440 A | 12/1990 |
| JP | 3-124990 A | 5/1991 |
| JP | 2005-204496 A | 7/2005 |
| JP | 2008-138532 A | 6/2008 |
| JP | 2008-527955 A | 7/2008 |
| JP | 2009-180151 A | 8/2009 |
| JP | 2009-281278 A | 12/2009 |
| JP | 2013-57300 A | 3/2013 |
| JP | 5337417 B2 | 11/2013 |
| JP | 2014-46897 A | 3/2014 |
| JP | 2014-158366 A | 8/2014 |
| WO | 2008/020511 A1 | 2/2008 |
| WO | WO 2014/038202 A1 | 3/2014 |
| WO | WO 2015/098328 A1 | 7/2015 |

* cited by examiner

ELECTRIC COMPRESSOR

TECHNICAL FIELD

The present disclosure relates to an electric compressor.

BACKGROUND ART

An electric compressor described in Patent Document 1 includes a cylindrical motor housing. An inner peripheral surface of the motor housing of Patent Document 1 is provided with a groove portion which is recessed outward in the radial direction. The groove portion is formed in a spiral shape to pass through the vicinity of an inverter element disposed at the outside of the motor housing.

An electric turbocharger described in Patent Document 2 includes a motor stator which is fixed into a bearing housing. The electric turbocharger of Patent Document 2 includes an outer sleeve which constitutes a water cooling jacket at the outside of the motor stator.

CITATION LIST

Patent Literature

Patent Document 1: Japanese Unexamined Patent Publication No. 2008-138532
Patent Document 2: International Publication WO 2008/020511

SUMMARY OF INVENTION

Technical Problem

In the above-described conventional electric turbocharger (electric compressor), the cooling of the inverter element or the stator portion is considered, but the cooling efficiency for the stator portion accommodated in the motor housing is not sufficient. The present disclosure will describe an electric compressor capable of improving cooling efficiency for the stator portion.

Solution to Problem

An electric compressor according to an aspect of the present disclosure includes a rotation shaft, a compressor impeller which is attached to the rotation shaft, a rotor portion which is attached to the rotation shaft, a stator portion which is disposed around the rotor portion, and a motor housing which accommodates the rotor portion and the stator portion. The motor housing includes an inner housing which includes a first cylindrical portion surrounding and holding the stator portion and an outer housing which includes a second cylindrical portion surrounding and holding the first cylindrical portion of the inner housing. An outer peripheral surface of the stator portion is in contact with an inner peripheral surface of the first cylindrical portion of the inner housing. An outer peripheral surface of the first cylindrical portion is provided with a first groove portion which serves as a cooling passage and is disposed to turn around an axis of the rotation shaft by one turn or more. The first groove portion includes a spiral groove portion.

Effects of Invention

According to an aspect of the present disclosure, it is possible to provide an electric compressor capable of improving cooling efficiency.

DESCRIPTION OF EMBODIMENTS

Figure 1:
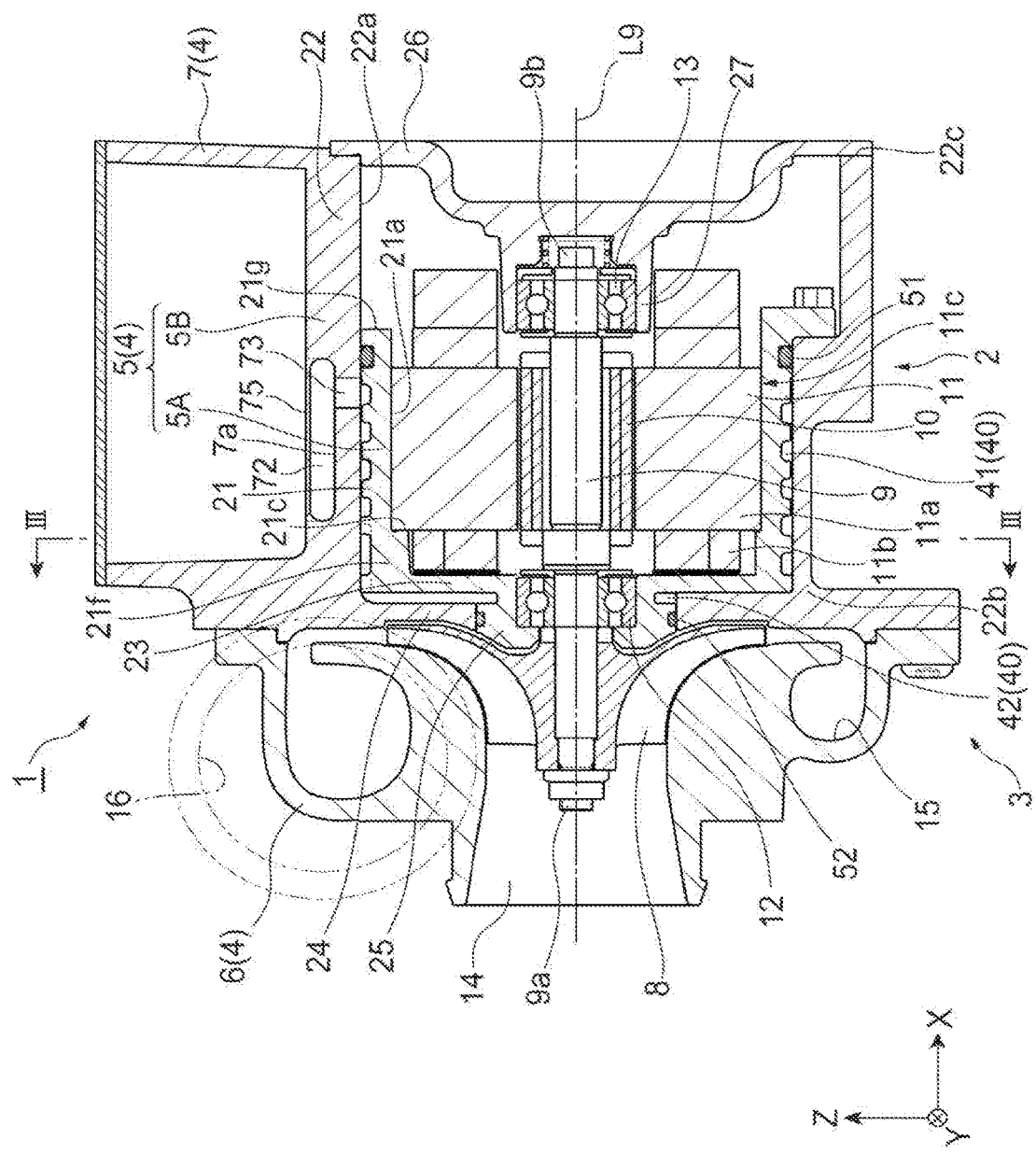
FIG. 1 is a cross-sectional view illustrating an electric turbocharger according to an embodiment of the present disclosure.

An electric compressor according to an aspect of the present disclosure includes a rotation shaft, a compressor impeller attached to the rotation shaft, a rotor portion attached to the rotation shaft, a stator portion disposed around the rotor portion, and a motor housing accommodating the rotor portion and the stator portion. The motor housing includes an inner housing which includes a first cylindrical portion surrounding and holding the stator portion and an outer housing which includes a second cylindrical portion surrounding and holding the first cylindrical portion of the inner housing. An outer peripheral surface of the stator portion is in contact with an inner peripheral surface of the first cylindrical portion of the inner housing. The outer peripheral surface of the first cylindrical portion is provided with a first groove portion which serves as a cooling passage and is disposed to turn around more than one turn around an axis of the rotation shaft. The first groove portion includes a spiral groove portion.

According to the electric compressor, since a cooling fluid flows through the first groove portion, the inner housing is cooled and the stator portion contacting the inner housing is cooled. Since the first groove portion includes the spiral groove portion and is formed to turn by one turn or more, it is possible to form the groove portion which is continuous in the circumferential direction of the rotation shaft and to continuously form the cooling passage while shifting the cooling passage in the extending direction of the rotation shaft. As a result, the cooling passage can be elongated as compared with the conventional one. Since the cross-sectional area of the cooling passage is decreased to increase the flow velocity as compared with the related art, it is possible to improve the cooling efficiency between the cooling fluid and the inner housing.

In some aspects, the flow of the cooling fluid inside the cooling passage may be a turbulent flow. In this case, it is possible to improve cooling efficiency by improving a heat transmission rate between the cooling fluid and the inner housing as compared with a laminar flow.

In some aspects, the first groove portion may be disposed in a range covering the entire length of the stator portion in the extending direction of the rotation shaft. In this case, since it is possible to uniformly cool the stator portion as a whole, it is possible to suppress a local temperature rise.

In some aspects, the rotation shaft may be supported by a bearing and the inner housing may include a third cylindrical portion which surrounds and holds the bearing. The third cylindrical portion protrudes toward the compressor impeller in relation to the first cylindrical portion in the extending direction of the rotation shaft. An outer peripheral surface of the third cylindrical portion may be provided with a second groove portion which serves as a cooling passage and is continuous in the circumferential direction of the rotation shaft. In this case, since the third cylindrical portion holding the bearing is formed to protrude in relation to the first cylindrical portion, an outer peripheral surface of the third cylindrical portion can be provided with a cooling passage. Accordingly, the bearing can be cooled.

In some aspects, the second groove portion may communicate with a first groove portion. In this case, a cooling fluid flowing through the first groove portion flows into the second groove portion. Since a series of cooling passages can be formed instead of a plurality of cooling passages, a simple configuration can be obtained.

In some aspects, an outer diameter of the third cylindrical portion may be smaller than an outer diameter of the first cylindrical portion. The inner housing may include a first wall portion which covers an end portion of the first cylindrical portion near the compressor and is formed from the outer peripheral surface of the first cylindrical portion to the outer peripheral surface of the third cylindrical portion in a radial direction of the rotation shaft. The outer housing may include a second wall portion which faces the first wall portion in the extending direction of the rotation shaft and is in contact with the first wall portion.

The second wall portion of the outer housing may be provided with a third groove portion which serves as a cooling passage and communicates the first groove portion with the second groove portion. In this case, since there is no need to form a groove portion in the first wall portion of the inner housing and it is possible to set the thickness of the first wall portion to be uniform, it is possible to suppress concern that the concentration of stress may occur.

In some aspects, the electric compressor may further include a heating element accommodation portion which is provided at the outside of the motor housing and accommodates a heating element. The cooling passage may communicate with the heating element accommodation portion. In this case, it is possible to cool the heating element accommodated in the heating element accommodation portion by causing the cooling fluid to flow into the heating element accommodation portion. The cooling passage may be formed to pass through the wall forming the heating element accommodation portion. Accordingly, it is possible to cool the heating element accommodated in the internal space of the heating element accommodation portion by cooling the heating element accommodation portion.

In some aspects, the heating element may be an inverter which controls an AC current of the stator portion. In this case, the inverter can be cooled while being accommodated in the heating element accommodation portion and hence the reliability of the inverter can be improved.

Hereinafter, an embodiment of the present disclosure will be described with reference to the drawings. Furthermore, in the description of the drawings, the same reference numerals will be given to the same components and a repetitive description thereof will be omitted. In the description below, the terms of the "radial direction" and the "circumferential direction" are used on the basis of a rotation shaft 9 or a rotation axis L9 unless otherwise specified.

Figure 2:
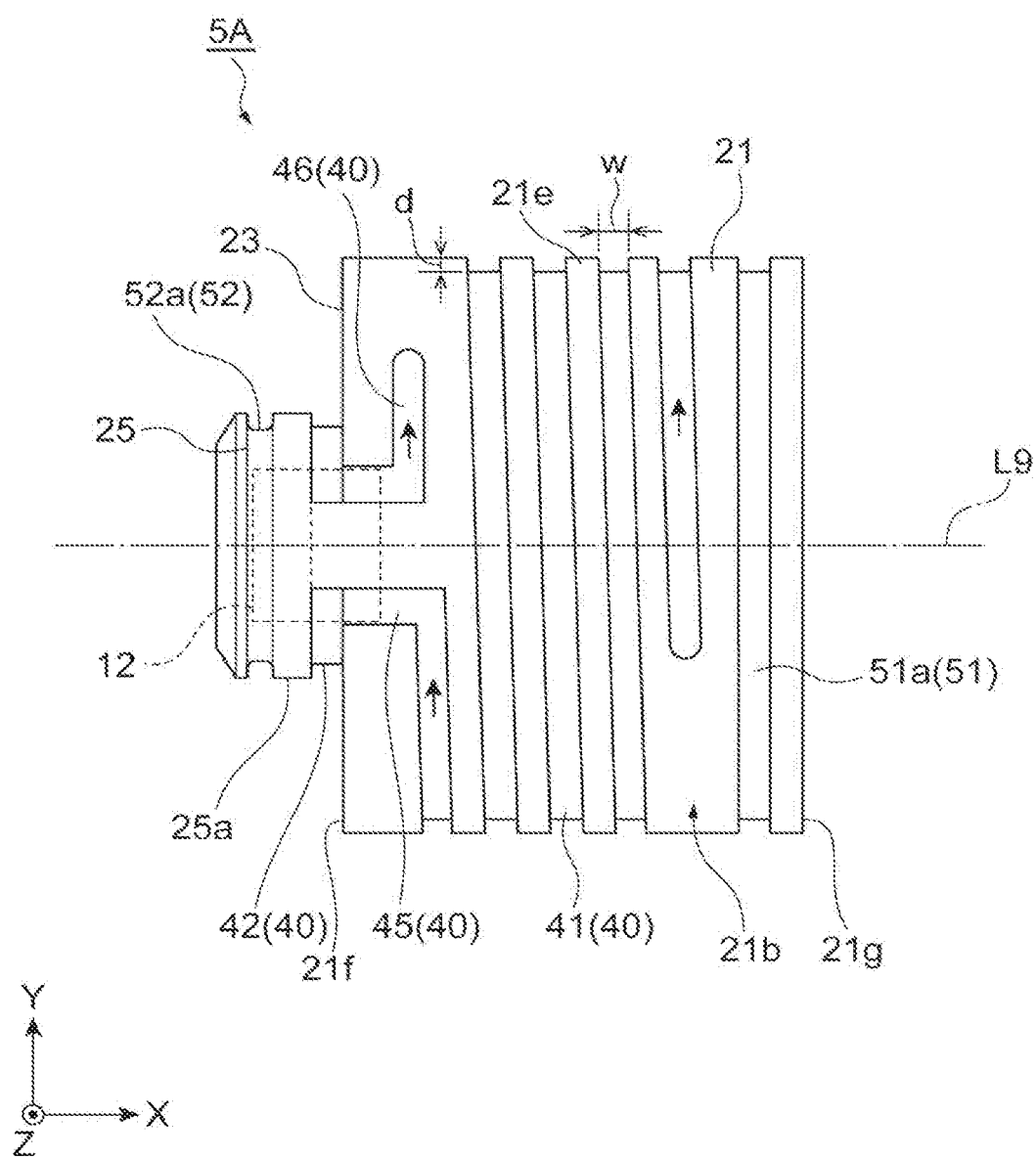
FIG. 2 is a plan view illustrating an inner housing of FIG. 1.
Figure 3:
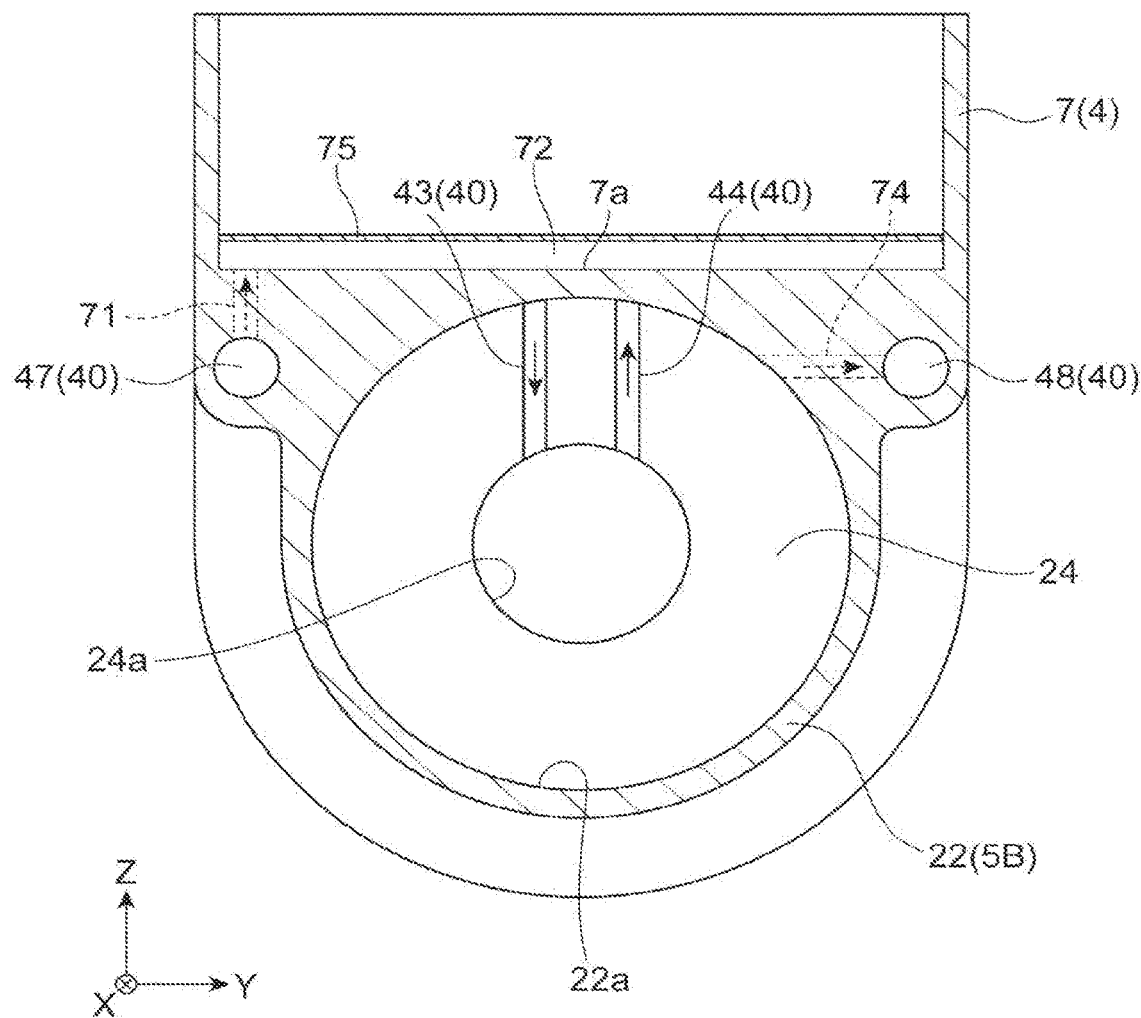
FIG. 3 is a cross-sectional view illustrating an outer housing of FIG. 1 and is a cross-sectional view taken along a line III-III.

Further, in FIGS. 1 to 3, three orthogonal directions (the X direction, the Y direction, and the Z direction) are indicated by arrows in the drawings. The X direction indicates the extending direction of the rotation shaft 9 or the rotation axis L9. The Y direction indicates the up to down direction of FIG. 2 and the right to left direction of FIG. 3. The Z direction indicates the up to down direction of FIGS. 1 and 3.

First, an electric turbocharger 1 will be described with reference to FIG. 1. The electric turbocharger 1 illustrated in FIG. 1 is applied to, for example, an internal combustion engine of a vehicle, a ship, or the like. The electric turbocharger 1 includes an electric motor 2 which is a driving source and a compressor (a centrifugal compressor) 3 which is driven by the electric motor 2. The electric turbocharger 1 compresses an internal fluid (for example, air) by the compressor 3. The electric turbocharger 1 includes a housing 4. The housing 4 includes a motor housing 5, a compressor housing 6, and an inverter housing 7.

The compressor 3 includes a compressor housing 6 and a compressor impeller 8 accommodated in the compressor housing 6. The electric motor 2 includes a motor housing 5, a rotation shaft 9, a rotor portion 10 provided in the rotation shaft 9, and a stator portion 11 disposed to surround the rotor portion 10. The rotation shaft 9 is rotatably supported by a pair of bearings 12 and 13 held by the motor housing 5.

A center portion (a main body) of the rotation shaft 9 is accommodated in the motor housing 5. A leading end portion (a first end portion) 9a of the rotation shaft 9 protrudes outward in the X direction from the motor housing 5. A proximal end portion (a second end portion) 9b of the rotation shaft 9 is disposed inside the motor housing 5. The proximal end portion 9b is held by, specifically, a lid portion 26 to be described later.

The compressor housing 6 is disposed at the first end side of the motor housing 5 (the left side of the drawing) and is fixed to the motor housing 5. The leading end portion 9a of the rotation shaft 9 enters the compressor housing 6. The compressor impeller 8 is attached to the leading end portion 9a of the rotation shaft 9 and is disposed inside the compressor housing 6.

The compressor housing 6 includes a suction port 14, a scroll portion 15, and a discharge port 16. In the compressor housing 6, the compressor impeller 8 rotates with the rotation of the rotation shaft 9. External air is sucked into the compressor housing 6 through the suction port 14 and is introduced to the compressor impeller 8. The air introduced to the compressor impeller 8 is compressed, is caused to pass through the scroll portion 15, and is discharged from the discharge port 16. The compressed air discharged from the discharge port 16 is supplied to an internal combustion engine.

The rotor portion 10 of the electric motor 2 is fixed to the center portion of the rotation shaft 9 in the longitudinal direction. The rotor portion 10 includes one or a plurality of permanent magnets (not illustrated) attached to the rotation shaft 9. The stator portion 11 is held by the inner surface of the motor housing 5 to surround the rotor portion 10 (this will be described later in detail). The stator portion 11 is disposed around the rotor portion 10.

The stator portion 11 includes a cylindrical core portion 11a which is disposed to surround the rotor portion 10 and a coil portion 11b which is formed by winding a wire (not illustrated) on the core portion 11a. When an AC current flows to the coil portion 11b of the stator portion 11 through a wire, the rotation shaft 9 rotates by the interaction of the rotor portion 10 and the stator portion 11. Accordingly, the compressor impeller 8 rotates to compress air as described above.

Next, the motor housing 5 will be described in detail. The motor housing 5 includes a cylindrical inner housing 5A which is disposed at the inside, that is, the side of the rotation shaft 9 and a cylindrical outer housing 5B which is disposed at the outside, that is, the outer peripheral side of the inner housing 5A. That is, the motor housing 5 has a structure divided into two parts. The inner housing 5A and the outer housing 5B are separated from each other and are disposed to be concentric with the rotation axis L9. The inner housing 5A is attached to the outer housing 5B by, for example, interference fitting (shrinkage fitting or the like).

The inner housing 5A and the outer housing 5B are formed of, for example, the same material. For example, since aluminum can be used, a decrease in weight can be realized. Each of the inner housing 5A and the outer housing 5B can be manufactured by, for example, die casting or the like. Since the inner housing 5A and the outer housing 5B are molded by a method which does not use a core, these housings can be simply manufactured.

The inner housing 5A surrounds and holds the stator portion 11. The stator portion 11 is attached to the inner housing 5A by, for example, shrinkage fitting or press-inserting. Accordingly, the inner housing 5A and the stator portion 11 are provided as a unit. The outer housing 5B surrounds and holds the inner housing 5A. The inner housing 5A and the stator portion 11 which are provided as a unit are attached to the outer housing 5B by, for example, interference fitting (shrinkage fitting or the like).

The inner housing 5A includes, as illustrated in FIG. 2, a first cylindrical portion 21 which has a cylindrical shape and extends in the direction of the rotation axis L9, a first end wall portion (a first wall portion) 23 which is provided to be continuous to the first end side of the first cylindrical portion 21, and an annular portion (a third cylindrical portion) 25 which protrudes from the first end wall portion 23 toward the compressor impeller 8 in the direction of the rotation axis L9. The first cylindrical portion 21 surrounds and holds the stator portion 11. In the direction of the rotation axis L9, the first end 21f of the first cylindrical portion 21 is disposed at the side of the leading end portion 9a of the rotation shaft 9 and the second end 21g of the first cylindrical portion 21 is disposed at the side of the rotation shaft 9 의 the proximal end portion 9b. The second end 21g of the first cylindrical portion 21 is opened. The first end wall portion 23 extends from the first end 21f of the first cylindrical portion 21 inward in the radial direction.

Here, an outer peripheral surface 11c of the stator portion 11 can be brought into close contact with an inner peripheral surface 21a of the first cylindrical portion 21. Furthermore, a gap may be partially formed between the outer peripheral surface 11c and the inner peripheral surface 21a. The outer peripheral surface 11c of the stator portion 11 is in contact with the inner peripheral surface 21a of the first cylindrical portion 21.

The length of the first cylindrical portion 21 in the direction of the rotation axis L9 is longer than the length of the outer peripheral surface 11c of the stator portion 11. The first cylindrical portion 21 is disposed to cover the entire length of the outer peripheral surface 11c of the stator portion 11 in the direction of the rotation axis L9.

A step portion 21c is provided at the inside of the first cylindrical portion 21. Specifically, the inner diameter of a portion at the side of the first end 21f of the first cylindrical portion 21 in the direction of the rotation axis L9 is smaller than those of the center portion and the portion at the side of the second end 21g. The inner diameter at the side of the first end 21f is smaller than the outer diameter of the outer peripheral surface 11c of the stator portion 11. In a case in which the stator portion 11 is attached to the first cylindrical portion 21, when the stator portion 11 is press-inserted from an opening at the side of the second end 21g of the first cylindrical portion 21, the stator portion 11 hits the step portion 21c and hence can be positioned with respect to the first cylindrical portion 21 in the direction of the rotation axis L9. Furthers tore, a structure in which the step portion 21c is not provided at the inside of the first cylindrical portion 21 may be used.

The annular portion 25 protrudes outward in the direction of the rotation axis L9 (the left side of the drawing) in relation to the first end 21f of the first cylindrical portion 21. The annular portion 25 is disposed to be concentric with the rotation axis L9. The outer diameter of the annular portion 25 is smaller than the outer diameter of the first cylindrical portion 21. A through-hole is provided at the center of the annular portion 25 in the radial direction and the rotation shaft 9 is inserted through the through-hole.

The annular portion 25 surrounds and holds the bearing 12. For example, the bearing 12 is press-inserted or clearance-fitted to the annular portion 25. The outer peripheral surface of the bearing 12 can be brought into close contact with the inner peripheral surface of the annular portion 25. The outer peripheral surface of the bearing 12 comes into contact with the inner peripheral surface of the annular portion 25.

The outer housing 5B includes a second cylindrical portion 22 which has a cylindrical shape and extends in the direction of the rotation axis L9, a second end wall portion (a second wall portion) 24 which is provided to be continuous to the first end side of the second cylindrical portion 22, and a lid portion 26 which covers an opening at the second end side of the second cylindrical portion 22. The second cylindrical portion 22 surrounds and holds the first cylindrical portion 21 of the inner housing 5A. In the direction of the rotation axis L9, the first end 22b of the second cylindrical portion 22 is disposed at the side of the leading end portion 9a of the rotation shaft 9 and the second end 22c of the second cylindrical portion 22 is disposed at the side of the proximal end portion 9b of the rotation shaft 9. The second end 22c of the second cylindrical portion 22 is opened and the lid portion 26 is attached to the opening of the second end 22c.

The lid portion 26 is provided with an annular bearing holding portion 27 which protrudes toward the inside (the side of the first end 22b) in the direction of the rotation axis L9. The bearing holding portion 27 is disposed, for example, at the outside of the first cylindrical portion 21 in the direction of the rotation axis L9. Furthermore, the bearing holding portion 27 may be disposed to the inside of the first cylindrical portion 21. The bearing 13 is held by the bearing holding portion 27. Then, the pair of bearings 12 and 13 is disposed at both sides of the stator portion 11 in the direction of the rotation axis L9.

The first cylindrical portion 21 is fitted into the second cylindrical portion 22 as described above. The outer peripheral surface 21b of the first cylindrical portion 21 is in close contact with the inner peripheral surface 22a of the second cylindrical portion 22 or is close thereto. The length of the second cylindrical portion 22 in the direction of the rotation axis L9 is longer than the length of the first cylindrical portion 21. The outer peripheral surface 21b of the first cylindrical portion 21 comes into contact with the inner peripheral surface 22a of the second cylindrical portion 22.

The second end wall portion 24 extends from the first end 22b of the second cylindrical portion 22 inward in the radial direction. As viewed from the direction of the rotation axis L9 (see FIG. 3), the second end wall portion 24 is formed in an annular shape and is disposed around the rotation axis L9. The second end wall portion 24 faces the first end wall portion 23 and contacts the first end wall portion 23 in the direction of the rotation axis L9.

The annular portion 25 of the inner housing 5A is inserted through the center opening of the second end wall portion 24. For example, the annular portion 25 is press-inserted or clearance-fitted to the center opening of the second end wall portion 24. The outer peripheral surface 25a of the annular portion 25 (see FIG. 2) is in close contact with an inner peripheral surface 24a of the center opening of the second end wall portion 24 or is close thereto. The outer peripheral surface 25a of the annular portion 25 comes into contact with the inner peripheral surface 24a of the center opening of the second end wall portion 24.

The inverter housing 7 illustrated in FIGS. 1 and 3 is an inverter accommodation portion which accommodates an inverter (not illustrated). The inverter controls an AC current supplied to the coil portion 11b of the stator portion 11. The inverter housing 7 is disposed, for example, at the outside of the outer housing 5B in the radial direction. The inverter housing 7 is formed in a box shape and is integrally formed with the outer housing 5B. For example, a part of a bottom portion 7a of the inverter housing 7 may serve as a part of the second cylindrical portion 22 of the outer housing 5B.

The electric turbocharger 1 of the embodiment includes a water cooling jacket (a cooling passage) 40 which cools the stator portion 11 or the like. A cooling fluid such as cooling water flows through the water cooling jacket 40. For example, the water cooling jacket 40 is disposed along the outer peripheral surface 21b of the first cylindrical portion 21 of the inner housing 5A to pass through the second cylindrical portion 22 of the outer housing 5B from the inverter housing 7. Further, the water cooling jacket 40 is disposed along the outer peripheral surface 25a of the annular portion 25. The water cooling jacket 40 is formed to reach the outside of the electric turbocharger 1 while passing through the second cylindrical portion 22 of the outer housing 5B. A detailed configuration of the water cooling jacket 40 will be described below.

The water cooling jacket 40 includes, as illustrated in FIGS. 1 and 3, a passage 47, a passage 71, a passage 72, and a passage 73. the passage 47 communicates the bottom portion 7a of the inverter housing 7 with the inner peripheral surface 22a of the second cylindrical portion 22. The passage 47 includes a passage which extends in the X direction inside the second cylindrical portion 22. The passage 47 communicates with the passage 71. The passage 71 extends in the Z direction inside the second cylindrical portion 22. The passage 71 communicates with the passage 72. The passage 72 is a space on the bottom portion 7a of the inverter housing 7. The upper portion of the passage 72 is covered with a lid 75. As illustrated in FIG. 1, the passage 72 communicates with the passage 73 which penetrates the inner peripheral surface 22a from the inside of the second cylindrical portion 22. Accordingly, the outer housing 5B can be cooled after the inverter housing 7 is cooled and the inverter therein is cooled.

The water cooling jacket 40 includes, as illustrated in FIG. 2, a first groove portion 41 which is formed in the outer peripheral surface 21b of the first cylindrical portion 21 of the inner housing 5A. The first groove portion 41 is disposed to turn around the rotation axis L9. The first groove portion 41 includes a spiral groove portion. The spiral groove portion is formed to be inclined with respect to the second radial direction (for example, the Y direction) orthogonal to the rotation shaft and the first radial direction when viewed from the first radial direction of the rotation shaft (for example, the Z direction). The spiral groove portion is formed in the entire length of the first groove portion 41. The spiral groove portion may be formed in a part of the first groove portion 41. The first groove portion 41 may include a linear portion when viewed from the outside of the radial direction.

The first groove portion 41 is disposed to turn, for example, by four turns or more. Further, the first groove portion 41 is disposed so that a position from the second end toward the first end is different in the direction of the rotation axis L9. The second end side of the first groove portion 41 is disposed to communicate with a passage 48. The second end side of the outer peripheral surface 21b of the first cylindrical portion 21 is provided with a seal portion 51 which is continuous in the circumferential direction. For example, an O-ring is attached to a seal groove 51a of the seal portion 51.

The cross-sectional shape of the first groove portion 41 is, for example, rectangular. The cross-sectional shape of the first groove portion 41 is uniform. The flow of the cooling water flowing through the first groove portion 41 is, for example, a turbulent flow. The Re number of the cooling water flowing through the first groove portion 41 is, for example, 10000 or more.

Further, the Re number can be calculated by using, for example, the following equation (1).

$$Re = (Du\rho)/\mu \qquad (1)$$

In the equation (1), D indicates the inner diameter of the groove portion, u indicates the average flow velocity, ρ indicates the density of the fluid, and μ indicates the viscosity.

The Re can be calculated by converting the inner diameter D using the depth d and the width w of the first groove portion 41.

A gap between the first groove portions 41 in the direction of the rotation axis L9 is, for example, about the width w of the first groove portion 41. The depth d of the first groove portion 41 is shorter than the width w of the first groove portion 41. By using such a first groove portion 41, the passage in which the cooling water flows can be formed to be elongated and the flow velocity of the cooling water can be increased as compared with the conventional cooling passage. The water cooling jacket 40 may include a passage which has a smaller cross-sectional area and a longer length as compared with the conventional cooling passage.

Furthermore, the present disclosure is not limited to an example in which the cross-sectional shape of the first groove portion 41 is rectangular and the cross-sectional shape may be, for example, other shapes such as a semi-circular shape and a V-shape.

A convex portion 21e formed between the first groove portions 41 may be slightly lower than both end portions of the first cylindrical portion 21 of the outer peripheral surface 21b in the longitudinal direction. For example, a gap may be formed between the convex portion 21e between the first groove portions 41 and the inner peripheral surface 22a of the second cylindrical portion 22. Accordingly, the first cylindrical portion 21 can be easily inserted into the second cylindrical portion 22 and hence an increase in processing cost of the first cylindrical portion 21 can be suppressed.

The outer peripheral surface 21b of the first cylindrical portion 21 is provided with a fifth groove portion 45 which is bent from the terminating end (the side of the first end 21f) of the spiral first groove portion 41 and extends in the direction of the rotation axis L9. The cross-sectional shape of the fifth groove portion 45 is the same as the cross-sectional shape of the spiral first groove portion 41. The fifth groove portion 45 is formed to reach the first end 21f. In FIG. 2, the fifth groove portion 45 is illustrated at the lower side in relation to the rotation axis L9.

The water cooling jacket 40 includes, as illustrated in FIG. 3, a third groove portion 43 provided in the second end wall portion 24 of the outer housing 5B. The third groove portion 43 is provided in a surface facing the first end wall portion 23 of the second end wall portion 24. The third groove portion 43 extends in the Z direction as illustrated in the drawing. The third groove portion 43 extends from a position corresponding to the inner peripheral surface 22a of the second cylindrical portion 22 to a position reaching the inner peripheral surface 24a of the center opening of the second end wall portion 24. The third groove portion 43 communicates the fifth groove portion 45 formed in the outer peripheral surface 21b of the first cylindrical portion 21 with the second groove portion 42 formed in the outer peripheral surface 25a of the annular portion 25.

The water cooling jacket 40 includes, as illustrated in FIG. 2, a second groove portion 42 which is formed in the outer peripheral surface 25a of the annular portion 25 of the inner housing 5A. The second groove portion 42 is provided for substantially one turn in the circumferential direction of the outer peripheral surface 25a. The second groove portion 42 is disposed at, for example, the base portion of the annular portion 25. For example, the second groove portion 42 is formed at the same position in the direction of the rotation axis L9. The second groove portion 42 is formed at a position corresponding to the center of the bearing 12 in the direction of the rotation axis L9. The cross-sectional shape of the second groove portion 42 is the same as, for example, the cross-sectional shape of the first groove portion 41.

The outer peripheral surface 25a of the annular portion 25 is provided with a seal portion 52. The seal portion 52 is disposed at the outside in relation to the second groove portion 42 in the direction of the rotation axis L9. The seal portion 52 includes a seal groove 52a which is formed in the outer peripheral surface 25a and an O-ring which is attached to the seal groove 52a.

The water cooling jacket 40 includes, as illustrated in FIG. 3, a fourth groove portion 44 provided in the second end wall portion 24 of the outer housing 5B. The fourth groove portion 44 is provided in a surface facing the first end wall portion 23 of the second end wall portion 24. The fourth groove portion 44 extends in the Z direction as illustrated in the drawing. The fourth groove portion 44 extends from the inner peripheral surface 24a of the center opening of the second end wall portion 24 to reach a position corresponding to the inner peripheral surface 22a of the second cylindrical portion 22. The fourth groove portion 44 communicates the terminating end portion of the second groove portion 42 formed in the outer peripheral surface 25a of the annular portion 25 with a sixth groove portion 46 to be described later formed in the outer peripheral surface 21b of the first cylindrical portion 21. The third groove portion 43 and the fourth groove portion 44 are separated from each other the Y direction and are disposed in parallel to, for example, the Z direction. Furthermore, the third groove portion 43 and the fourth groove portion 44 may be formed in the first end wall portion 23 of the inner housing 5A.

The water cooling jacket 40 includes the sixth groove portion 46 which is formed in the outer peripheral surface 21b of the first cylindrical portion 21. The sixth groove portion 46 includes a portion which extends in the direction of the rotation axis L9 from the first end 21f of the outer peripheral surface 21b and a portion which is bent from that portion and extends in the circumferential direction. The sixth groove portion 46 communicates the fourth groove portion 44, the passage 48, and a passage 74 to be described later with one another.

The water cooling jacket 40 includes, as illustrated in FIG. 3, the passage 48 and the passage 74 which pass through the outer housing 5B. The passage 74 extends in the Y direction from the inner peripheral surface 22a of the second cylindrical portion 22. The passage 48 includes a portion which extends in the X direction inside the second cylindrical portion 22. For example, the passage 48 is formed to reach the second end 22c of the second cylindrical portion 22. Cooling water flowing through the passage 48 is discharged to the outside of the electric turbocharger 1.

In such an electric turbocharger 1, the cooling water supplied to the passage 47 passes through the passage 71 and reaches the passage 72. The cooling water inside the passage 72 cools the inverter accommodated in the inverter housing 7. Then, the cooling water inside the passage 72 of the bottom portion 7a of the inverter housing 7 flows through the passage 73 and reaches the first groove portion 41 at the outer peripheral surface 21b of the first cylindrical portion 21 of the inner housing 5A. Since the first groove portion 41 forms a passage of a substantially closed space between the first groove portion and the inner peripheral surface 22a of the second cylindrical portion 22, the cooling water flows along the first groove portion 41.

The cooling water flows through the spiral first groove portion 41. The cooling water turns a plurality of times in the circumferential direction. The cooling water exchanges heat with the first cylindrical portion 21 of the inner housing 5A. Accordingly, the first cylindrical portion 21 is cooled. Further, since the inner peripheral surface 21a of the first cylindrical portion 21 is in close contact with the outer peripheral surface 11c of the stator portion 11, heat is exchanged between the first cylindrical portion 21 and the stator portion 11. As a result, since the stator portion 11 is cooled, a temperature rise of the stator portion 11 is suppressed.

The cooling water flowing through the spiral first groove portion 41 flows through the fifth groove portion 45 and reaches the first end of the first cylindrical portion 21. The cooling water flows into the third groove portion 43 of the second end wall portion 24 of the outer housing 5B. The cooling water flowing through the third groove portion reaches the outer peripheral surface 25a of the annular portion 25. Since the fifth groove portion 45 forms a passage of a substantially closed space between the fifth groove portion and the inner peripheral surface 22a of the second cylindrical portion 22, the cooling water flows along the fifth groove portion 45. Since the third groove portion 43 forms a passage of a substantially closed space between the third groove portion and the first end wall portion 23 of the inner housing 5A, the cooling water can flow along the third groove portion 43.

The cooling water reaching the outer peripheral surface 25a of the annular portion 25 flows into the second groove portion 42. Since the second groove portion 42 forms a passage of a substantially closed space between the second groove portion and the inner peripheral surface 24a of the center opening of the second end wall portion 24 of the outer housing 5B, the cooling water flows along the second groove portion 42. The cooling water flowing through the second groove portion 42 flows substantially one turn in the circumferential direction of the annular portion 25. The cooling water exchanges heat with the annular portion 25. Accordingly, the annular portion 25 is cooled. Since the inner peripheral surface of the annular portion 25 is in close contact with the outer peripheral surface of the bearing 12, heat is exchanged between the annular portion 25 and the bearing 12. As a result, since the bearing 12 is cooled, a temperature rise of the bearing 12 is suppressed.

The cooling water flowing through the second groove portion 42 flows into the fourth groove portion 44 formed in the second end wall portion 24 of the outer housing 5B. Since the fourth groove portion 44 forms a passage of a substantially closed space between the fourth groove portion and the first end wall portion 23 of the inner housing 5A similarly to the third groove portion 43, the cooling water flows along the fourth groove portion 44. The cooling water flowing through the fourth groove portion 44 reaches the outer peripheral surface 21b of the first cylindrical portion 21 again. The cooling water flows through the sixth groove portion 46 formed in the outer peripheral surface 21b. Since the sixth groove portion 46 forms a passage of a substantially closed space between the sixth groove portion and the inner peripheral surface 22a of the second cylindrical portion 22 similarly to the fifth groove portion 45, the cooling water flows along the sixth groove portion 46.

The cooling water flowing through the sixth groove portion 46 passes through the passage 74 from the inner peripheral surface 22a of the second cylindrical portion 22 of the outer housing 5B and flows into the passage 48. The cooling water flows in the outer housing 5B (the wall), advances in the X direction, and is discharged to the outside of the electric turbocharger 1.

According to such an electric turbocharger 1, in the inner housing 5A, the first groove portion 41 includes the spiral groove portion and is formed to turn by one turn or more. In the electric turbocharger 1, it is possible to form the first groove portion 41 which is continuous in the circumferential direction of the rotation shaft 9 and to continuously form the cooling passage while shifting its position in the extending direction of the rotation axis L9. As a result, the groove portion through which the cooling water flows can be formed to be elongated as compared with the related art. When the cross-sectional area of the first groove portion 41 is decreased to increase the flow velocity, the cooling efficiency between the cooling water and the inner housing 5A can be improved.

When the flow of the cooling water flowing through the first groove portion 41 is a turbulent flow, it is possible to improve cooling efficiency by improving a heat transfer rate between the cooling water and the inner housing 5A.

The first groove portion 41 is disposed in a range covering the entire length of the stator portion 11 in the direction of the rotation axis L9. Accordingly, it is possible to cool the stator portion 11 without unevenness as a whole and to suppress a local temperature rise of the stator portion 11.

The inner housing 5A includes the annular portion 25 which protrudes in the direction of the rotation axis L9 and the bearing 12 is held by the annular portion 25. For that reason, the bearing 12 can be cooled by forming the second groove portion 42 in the outer peripheral surface 25a of the annular portion 25.

Since the third groove portion 43 which communicates the first groove portion 41 and the second groove portion 42 with each other is formed in the second end wall portion 24 of the outer housing 5B, there is no need to form a groove portion in the first end wall portion 23 of the inner housing 5A. For that reason, since it is possible to set the thickness of the first end wall portion 23 to be uniform, it is possible to suppress the occurrence of concentrated stress.

Although the embodiment of the present disclosure has been described, the present disclosure is not limited to the above-described embodiment.

For example, in the above-described embodiment, the first groove portion 41 and the second groove portion 42 communicate with each other, but different channels of the cooling water may be supplied to the first groove portion 41 and the second groove portion 42.

In the above-described embodiment, the inverter is accommodated in the inverter housing (the heating element accommodation portion) 7, but other heating elements may be accommodated therein.

In the above-described embodiment, the cooling water supplied to the inverter housing 7 is supplied to the first groove portion 41, but the cooling water supplied from the outside may be supplied to the first groove portion 41.

In the above-described embodiment, the cooling water flows from the second end 21g of the first cylindrical portion 21 to the first end 21f thereof in the direction of the rotation axis L9, but the cooling water may flow from the first end 21f to the second end 21g.

In the above-described embodiment, the first groove portion 41 is disposed in a range covering the entire length of the stator portion 11 in the direction of the rotation axis L9, but the first groove portion 41 may be disposed in a range covering a part of the stator portion 11.

The cooling fluid is not limited to water and may be other liquids such as oil. The electric compressor may include a turbine.

INDUSTRIAL APPLICABILITY

According to some aspects of the present disclosure, it is possible to provide an electric compressor capable of improving cooling efficiency.

REFERENCE SIGNS LIST

1: electric turbocharger, 2: electric motor, 3: compressor (centrifugal compressor), 4: housing, 5: motor housing, 5A: inner housing, 5B: outer housing, 6: compressor housing, 7: inverter housing, 7a: bottom portion, 8: compressor impeller, 9: rotation shaft, 9a: leading end portion (first end portion), 9b: proximal end portion (second end portion), 10: rotor portion, 11: stator portion, 11a: core portion, 11b: coil portion, 11c: outer peripheral surface, 12: hearing, 13: bearing, 14: suction port, 15: scroll portion, 16: discharge port, 21: first cylindrical portion, 21a: inner peripheral surface, 21b: outer peripheral surface, 21c: step portion, 21e: convex portion, 21f: first end, 21g: second end, 22: second cylindrical portion, 22a: inner peripheral surface, 22b: first end, 22c: second end, 23: first end wall portion (first wall portion), 24: second end wall portion (second wall portion), 24a: inner peripheral surface, 25: annular portion (third cylindrical portion), 25a: outer peripheral surface, 26: lid portion, 27: bearing holding portion, 40: water cooling jacket (cooling passage), 41: first groove portion (spiral groove portion), 42: second groove portion, 43: third groove portion, 44: fourth groove portion, 45: fifth groove portion, 46: sixth groove portion, 47: passage, 48: passage, 51: seal portion, 51a: seal groove, 52: seal portion, 52a: seal groove, 71: passage, 72: passage, 73: passage, 74: passage, 75: lid, L9: rotation axis, X: X direction (extending direction of rotation axis), Y: Y direction (second radial direction), Z: Z direction (first radial direction, perpendicular line).

The invention claimed is:

1. An electric compressor comprising:
   a rotation shaft;
   a compressor impeller which is attached to the rotation shaft;
   a rotor portion which is attached to the rotation shaft;
   a stator portion which is disposed around the rotor portion; and
   a motor housing which accommodates the rotor portion and the stator portion,
   wherein the motor housing includes an inner housing which includes a first cylindrical portion surrounding and holding the stator portion and an outer housing which includes a second cylindrical portion surrounding and holding the first cylindrical portion of the inner housing,
   wherein an outer peripheral surface of the stator portion is in contact with an inner peripheral surface of the first cylindrical portion of the inner housing,
   wherein an outer peripheral surface of the first cylindrical portion is provided with a first groove portion which serves as a cooling passage and is disposed to turn around an axis of the rotation shaft by one turn or more,
   wherein the first groove portion includes a spiral groove portion,
   wherein the rotation shaft is supported by a bearing,
   wherein the inner housing includes a third cylindrical portion which surrounds and holds the bearing,
   wherein the third cylindrical portion protrudes toward the compressor impeller in relation to the first cylindrical portion in an extending direction of the rotation shaft,
   wherein an outer diameter of the third cylindrical portion is smaller than an outer diameter of the first cylindrical portion,
   wherein an outer peripheral surface of the third cylindrical portion is provided with a second groove portion which serves as a cooling passage and is continuous in a circumferential direction of the rotation shaft,
   wherein the inner housing includes a first wall portion which covers an end portion of the first cylindrical portion near the compressor and is formed from the outer peripheral surface of the first cylindrical portion to the outer peripheral surface of the third cylindrical portion in a radial direction of the rotation shaft,
   wherein the outer housing includes a second wall portion which faces the first wall portion in the extending direction of the rotation shaft and is in contact with the first wall portion, and
   wherein the second wall portion of the outer housing is provided with a third groove portion which serves as a cooling passage and communicates the first groove portion with the second groove portion.

2. The electric compressor according to claim 1,
   wherein a flow of a cooling fluid inside the cooling passage is a turbulent flow.

3. The electric compressor according to claim 1,
   wherein the stator portion includes a core portion surrounding the rotor portion, and
   wherein the first groove portion is disposed in a range covering the entire length of the core portion in an extending direction of the rotation shaft.

4. The electric compressor according to claim 1, further comprising:
   a heating element accommodation portion which is provided at the outside of the motor housing and accommodates a heating element,
   wherein the cooling passage communicates with the heating element accommodation portion.

5. The electric compressor according to claim 4,
   wherein the heating element is an inverter which controls an AC current of the stator portion.

* * * * *